(12) United States Patent
Hsu et al.

(10) Patent No.: US 12,736,176 B2
(45) Date of Patent: Sep. 15, 2026

(54) PIVOT SHAFT TORQUE MECHANISM

(71) Applicant: FOSITEK CORPORATION, New Taipei City (TW)

(72) Inventors: An Szu Hsu, New Taipei City (TW); Yan-Jiao Cheng, New Taipei City (TW); I-Hung Chiang, New Taipei City (TW)

(73) Assignee: FOSITEK CORPORATION, New Taipei City (TW)

(*) Notice: Subject to any disclaimer, the term of this patent is extended or adjusted under 35 U.S.C. 154(b) by 0 days.

(21) Appl. No.: 18/919,886

(22) Filed: Oct. 18, 2024

(65) Prior Publication Data

US 2025/0354650 A1 Nov. 20, 2025

(30) Foreign Application Priority Data

May 14, 2024 (TW) ................................ 113117738

(51) Int. Cl.
*F16M 13/02* (2006.01)

(52) U.S. Cl.
CPC ..... *F16M 13/022* (2013.01); *F16M 2200/065* (2013.01)

(58) Field of Classification Search
CPC . F16M 13/022; F16M 2200/065; G09G 9/301
USPC ....................................................... 248/276.1
See application file for complete search history.

(56) References Cited

U.S. PATENT DOCUMENTS

| | | | | |
|---|---|---|---|---|
| 7,591,128 | B2 * | 9/2009 | Komiya | F16G 13/16 59/900 |
| 9,163,699 | B2 * | 10/2015 | Jaeker | H02G 11/006 |
| 9,188,194 | B2 * | 11/2015 | Hermey | F16G 13/16 |
| 9,510,470 | B2 * | 11/2016 | Huitema | G04G 17/08 |
| 9,870,031 | B2 * | 1/2018 | Hsu | G06F 1/1681 |
| 9,915,981 | B2 * | 3/2018 | Hsu | G06F 1/1652 |
| 10,338,638 | B2 | 7/2019 | Park et al. | |
| 11,553,612 | B2 * | 1/2023 | Chen | H05K 5/0226 |
| 11,927,245 | B2 * | 3/2024 | Strack | H02G 11/00 |

* cited by examiner

*Primary Examiner* — Anita M King
(74) *Attorney, Agent, or Firm* — Rosenberg, Klein & Lee

(57) ABSTRACT

A pivot shaft torque mechanism includes a plurality of pivot shafts equally spaced on a flexible plate; and a plurality of staggered first and second torque plates each being correspondingly provided with a shaft hole and an elongated shaft hole. Each pivot shaft is extended through one elongated shaft hole and one shaft hole on two adjacent torque plates. Each elongated shaft hole is provided with a front and a rear stop section. The pivot shafts are located in the elongated shaft holes and pressed against the rear or the front stop sections when the flexible plate is in an extended or a bent state, respectively, to adapt to a change of interval between the first and second torque plates. The pivot shafts in the elongated shaft holes interfering with the stop sections can provide a self-locking mechanism to force the flexible plate to keep the extended or bent state.

21 Claims, 6 Drawing Sheets

L
21
22
2
1
7
71
72
5
6
3
340
4
81
82
8
70

1
6
4
5
71
82
3
8
70

L
A
2
40
2
50
50

A
4232
L
50
2
70
422
42
4222
40
1
414
413
70
2
412
22
50
411

PIVOT SHAFT TORQUE MECHANISM

FIELD OF THE INVENTION

The present invention relates to a pivot shaft torque mechanism, and more particularly, to a torque mechanism that is preloaded and provides a self-locking function to effectively prevent an object using the pivot shaft from gravitating down, so that the object is stably and reliably kept in an extended state or a bent state.

BACKGROUND OF THE INVENTION

With the wide application of the wearable flexible display, many relevant pivot shaft torque mechanisms have also been introduced into the market. For example, China Patent Publication No. CN 111556687B discloses a cover and a smart bracelet featured by a synchronizing component provided between a case and a cover that are connected to each other. The case includes a first case, two third cases, and a plurality of second cases that are arranged parallelly. The cover includes a first cover, two third covers, and a plurality of second covers, which are correspondingly connected to the first, the third, and the second cases. The synchronizing component includes a plurality of overlapped and staggered hinge bases, on which shaft sections are provided to extend through staggered first, second and third hinges and damper hinges. The damper hinges include a plurality of overlapped and staggered strip-like bodies, each of which has an elongated damping slot and a shaft hole for engaging with one adjacent shaft section. The damping slot is provided at two ends with a first and a second locating slot, and provided at the end close to the first locating slot with an open cut. The damping slot is used to clamp the shaft section thereto to generate a resistance (torque) to a pivotal rotation of the shaft section. When the synchronizing component is in a fully extended state, the shaft sections are located in the first locating slots; and when the synchronizing component is in a fully bent state, the shaft sections are located in the second locating slots, so as to adapt to a reduced length at an inner side of the synchronizing component.

The above structure in practical application has the following drawbacks:

(1) When the above conventional wearable flexible display (i.e. the smart bracelet) is in use, the flexible display usually has to be extended into a flat state for a user to touch the flexible display and perform different functions. However, the elongated damping slots on the damping hinges provide only a simple torque (i.e. frictional resistance) to the shaft sections without any function of guiding the shaft sections to move and locking the shaft sections at some specific angle (for fully extending or bending the flexible display). Therefore, the flexible display could not be held in the same state when it is fully extended or fully bent. Further, when the flexible display in the extended and flat state is touched with a force, the damping hinges might not be able to withstand the force to result in bending and deformation of the flexible display, which has a direct adverse influence on the user's operation on the flexible display and forms an serious disadvantage in the application of the flexible display.

(2) The case consists of the parallelly arranged first, second and third cases that respectively have a flat top. When the case is bent, uneven and sharp protrusions would be formed at joints among the first, the second, and the third covers. These sharp protrusions not only have an adverse influence on the evenness of the flexible display provided on the top of the cases, but also cause abrasion and damage of the flexible display in some worse condition.

(3) The adjacent hinge bases of the synchronizing component are movably connected by overlapping each other, there would be a relatively large friction between the adjacent hinge bases when they move. Further, when the adjacent hinge bases are extended or bent, they are apt to be stuck at some specific angular positions to adversely influence the smooth extending or bending of the whole flexible display.

(4) The strip-like bodies of the damping hinges are movable in a linked motion due to a torque (i.e. a frictional resistance) transmitted between the damping slots and the shaft sections. When the case starts bending, it is usually difficult for the first, the second, and the third cases located at different locations to bend synchronously and the cases at different areas tend to have non-uniform curvatures to affect the delicacy and overall quality of the product.

In view of the drawbacks of the conventional pivot shaft torque mechanism for the wearable flexible display, it is tried by the inventor to develop an improved pivot shaft torque mechanism.

SUMMARY OF THE INVENTION

A primary object of the present invention is to provide a pivot shaft torque mechanism, which includes a flexibly bendable flexible plate; a plurality of pivot shafts spaced on a surface of the flexible plate and having a line of centers extended in parallel with the flexible plate; a plurality of first torque plates respectively having a first shaft hole and a first elongated shaft hole; and a plurality of second torque plates respectively having a second shaft hole and a second elongated shaft hole corresponding to the first shaft hole and the first elongated shaft hole, respectively. Each of the pivot shafts extends through one first elongated shaft hole and one second shaft hole, or one first shaft hole and one second elongated shaft hole, such that each second torque plate overlaps one first torque plate and is connected thereto via the pivot shaft. Each of the first and second elongated shaft holes is provided with a front and a rear stop section. When the flexible plate changes its state in response to an external force applied thereto, the pivot shafts are synchronously brought by the flexible plate to move in the first and the second elongated shaft holes in a linked motion, so as to adapt to a change in an overall length of the connected first and second torque plates that occurs when the flexible plate is moved. Meanwhile, the pivot shafts in the first and the second elongated shaft holes interfere with the stop sections to provide a self-locking or locating mechanism between the first and the second torque plates. When the flexible plate is fully extended into a flat state, the pivot shafts interfere partially with the first and the second shaft holes, such that the torque plates act on the pivot shafts for the latter to generate a force for pushing the flexible plate to keep the flat state and giving the flexible plate a structural strength required for withstanding an operational force applied thereto.

Another object of the present invention is to provide the above pivot shaft torque mechanism, of which each of the first and the second elongated shaft holes includes a first and a second inward protruded curved section, respectively, which is located at a middle portion of a displacement path of the pivot shaft in the first and the second elongated shaft hole; the first elongated shaft hole is divided into a first front space and a first rear space based on the first inward protruded curved section; and the second elongated shaft hole is divided into a second front space and a second rear space based on the second inward protruded curved section. The first and the second inward protruded curved section respectively include a first/second front stop section and a first/second rear stop section corresponding to the first/second front and the first/second rear space. Each of the pivot shaft is movable in the first/second front space or in the first/second rear space and is pressed against the first/second front stop section or the first/second rear stop section to be held in place, such that the flexible plate can be correspondingly held to the fully bent state or the fully extended flat state.

A further object of the present invention is to provide the above pivot shaft torque mechanism, of which each of the pivot shafts is provided with a flat portion, and each of the first and the second shaft holes are provided with a first and a second straight portion, respectively. When the flexible plate is fully extended into the flat state, the flat portions are rotated to a position being partially interfered with the first and the second straight portion, such that the pivot shafts cause the flexible plate to generate a force for keeping flat.

A still further object of the present invention is to provide the above pivot shaft torque mechanism, of which the flexible plate in the process of extending or bending can directly bring the pivot shafts to rotate synchronously, so that the first and the second torque plates also move synchronously with the pivot shafts. However, all fixed sections of the pivot shafts do not contact with or press against each other, and the flexible plate can be extended or bent smoothly without being stuck. Since the pivot shafts are spaced on the flexible plate, the flexible plate in the bent state has a flexibly bent and smoothly curved portion left between any two adjacent pivot shafts without forming any angled or sharp protrusion, and it is possible to prevent a flexible display provided on the flexible plate from abrasion and damage.

To achieve the above and other objects, the pivot shaft torque mechanism according to the present invention includes a flexibly bent flexible plate; a plurality of pivot shafts equally spaced on a surface of the flexible plate and movable in a linked motion with a line of centers of the pivot shaft extending in parallel with the flexible plate; and a torque chain unit consisting of a first torque plate set and a second torque plate set; the first torque plate set including a plurality of first torque plates located at a first linking position, and each of the first torque plates being provided with a first shaft hole and a first elongated shaft hole; the second torque plate set including a plurality of second torque plates located at a second linking position, which is in parallel with the first linking position, and each of the second torque plates being provided with a second shaft hole and a second elongated shaft hole; the second shaft holes being located corresponding to the first elongated shaft holes, and the second elongated shaft holes being located corresponding to the first shaft holes; each of the pivot shafts being extended through and pivotally connected to each pair of correspondingly located first shaft hole and second elongated shaft hole or each pair of correspondingly located first elongated shaft hole and second shaft hole, such that the second torque plates and the first torque plates overlap each other and are arranged alternately to be connected serially via the pivot shafts; and the flexible plate being changeable between a flat state and a bent state in response to an external force applied thereto, while the first and the second elongated shaft holes providing the pivot shafts with a space for displacement to adapt to a change of interval between the first and the second torque plates and between the pivot shafts when the flexible plate is extended or bent.

In the above structure, each of the first shaft holes is provided at a lateral side with a first straight portion and a first outer cut that is communicable with an outer side of the first shaft hole, each of the second shaft holes is provided at a lateral side with a second straight portion and a second outer cut that is communicable with an outer side of the second shaft hole, and each of the pivot shafts is provided on an outer surface with a flat portion. When the flexible plate is in a fully extended and flat state, the flat portions are rotated to a position being partially angularly interfered with the first and the straight portions, such that the first torque plate set and the second torque plate set respectively generate a force to push the pivot shafts toward a location for the flexible plate to keep flat.

In the above structure, each of the first and the second elongated shaft holes includes a first and a second inward protruded curved section, respectively, which is located at a middle portion of a displacement path of the pivot shaft in the first and the second elongated shaft hole; the first elongated shaft hole being divided into a first front space and a first rear space based on the first inward protruded curved section; and the second elongated shaft hole being divided into a second front space and a second rear space based on the second inward protruded curved section.

In the above structure, the first inward protruded curved section includes a first front stop section facing toward the first front space and a first rear stop section facing toward the first rear space, and the second inward protruded curved section includes a second front stop section facing toward the second front space and a second rear stop section facing toward the second rear space. When the flexible plate is in the bent state, the pivot shafts are located in the first and the second front space of the first and the second elongated shaft holes and pressed against the first and the second front stop sections, respectively, to provide a locating effect of forcing the flexible plate to keep the bent state. When the flexible plate is in the extended flat state, the pivot shafts are located in the first and the second rear spaces of the first and the second elongated shaft holes and pressed against the first and the second rear stop sections, respectively, to provide a locating effect of forcing the flexible plate to keep the flat state.

In the above structure, an end of each of the first and the second shaft holes located farther away from the first and the second outer cut communicates with a first and a second hollow hole via a first and a second inner cut, respectively.

In the above structure, each of the first and the second elongated shaft holes are provided at an end close to the first and the second shaft hole with a first and a second front retreated portion, respectively, and at another end farther away from the first and the second shaft hole with a first and a second rear retreated portion, respectively.

In the above structure, the pivot shaft torque mechanism further includes a first and a second stop plate set superposed on the first and the second torque plate, respectively; the first and the second stop plate set include a plurality of first and second stop plates, respectively. The first stop plates are superposed on the first torque plates and respectively include a first limiting hole and a first elongated limiting hole corresponding to the first shaft hole and the first elongated shaft hole on the first torque plate, respectively. And, the second stop plates are superposed on the second torque plates and respectively include a second limiting hole and a second elongated limiting hole corresponding to the second shaft hole and the second elongated shaft hole on the second torque plate, respectively.

In the above structure, the pivot shaft torque mechanism further includes a support unit provided on the surface of the flexible plate. The support unit includes a plurality of elongated supports parallelly arranged side by side, and the pivot shafts are fastened to the supports.

In the above structure, each of the supports is provided with at least one supporting section, and each of the supporting sections is provided with an engaging bore for one of the pivot shafts to engage therewith.

In the above structure, each of the pivot shafts has a distal end that is located farther away from the supporting section and extended through and pivotally connected to the torque chain unit, and the distal ends of the pivot shafts are respectively covered with a pressing cover.

In the above structure, the distal end of each of the pivot shafts is provided with a fastening hole and each of the pressing covers is provided with a through hole. A plurality of fastening elements is extended through the through holes to be removably fastened to the fastening holes for covering the pressing covers on the distal ends of the pivot shafts.

The structure and the technical means adopted by the present invention to achieve the above and other objects can be best understood by referring to the following detailed description of the preferred embodiment and the accompanying drawings.

BRIEF DESCRIPTION OF THE DRAWINGS

Wherein, the accompanying drawings include.

DETAILED DESCRIPTION OF THE PREFERRED EMBODIMENTS

Figure 1:
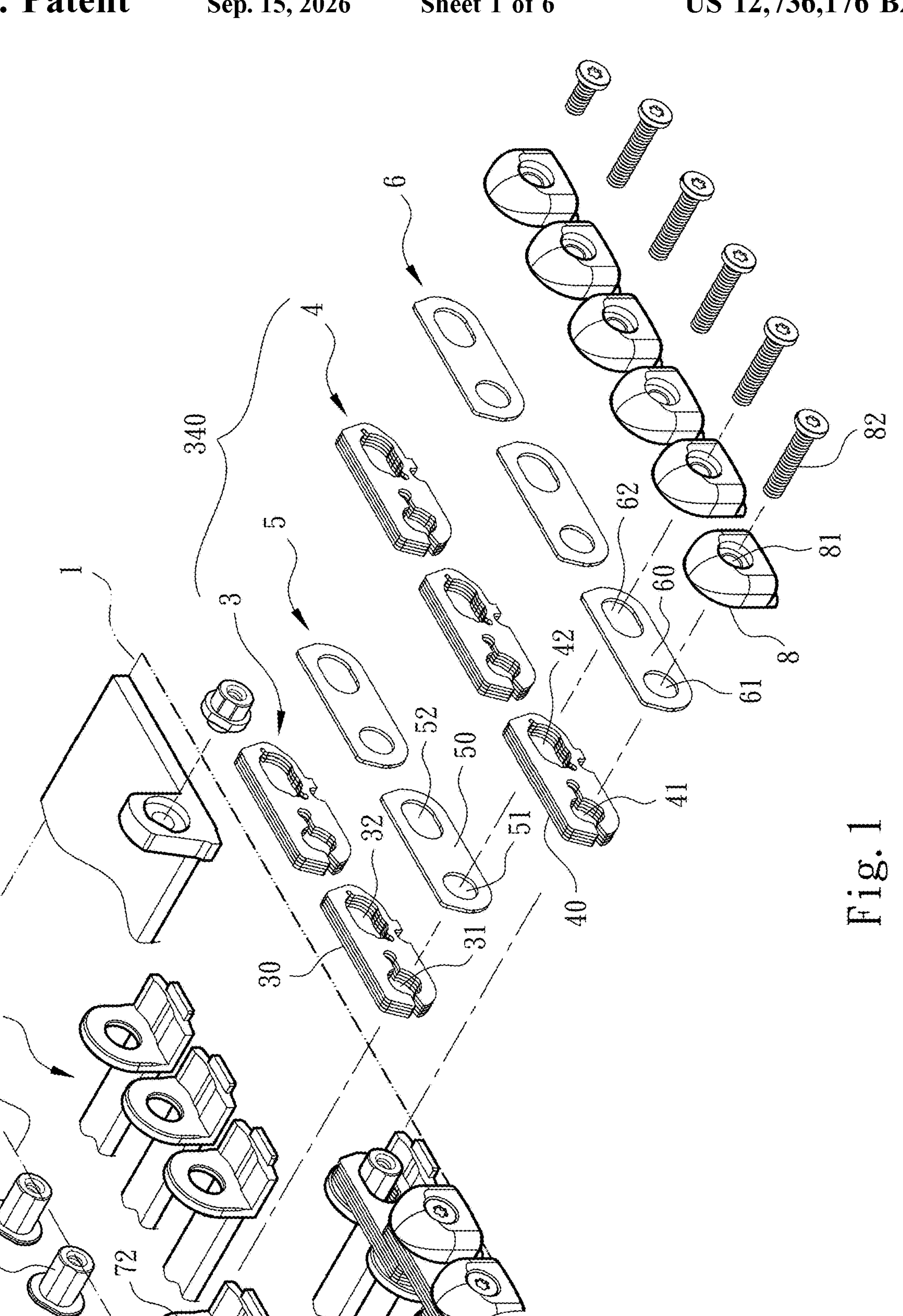
FIG. 1 is an exploded perspective view of a pivot shaft torque mechanism according to a preferred embodiment of the present invention.
Figure 2:
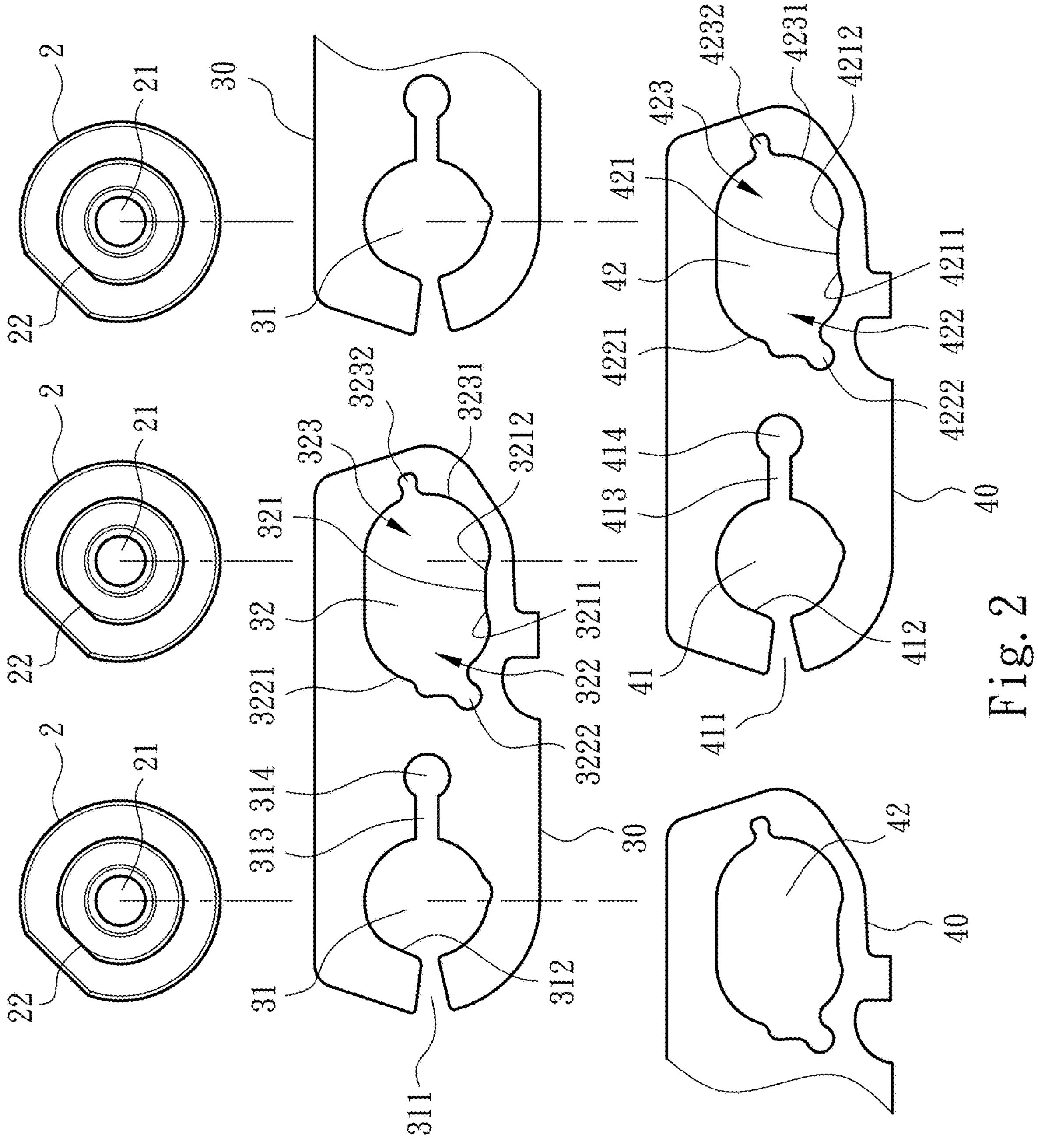
FIG. 2 is a side view showing the arrangement of first and second torque plates and their positions relative to pivot shafts included in the pivot shaft torque mechanism of the present invention.
Figure 3:
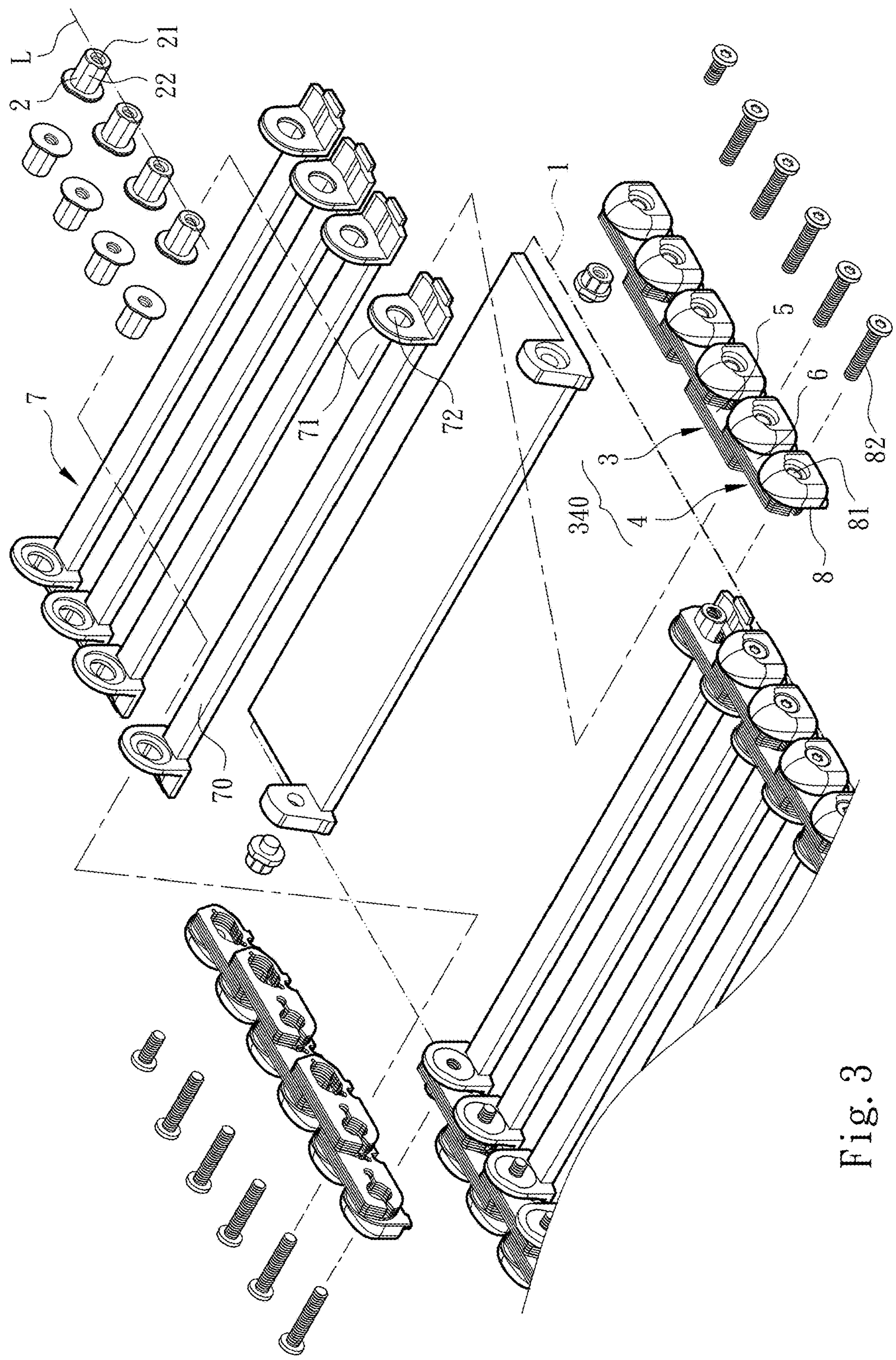
FIG. 3 is a partially assembled view of FIG. 1.
Figure 4:
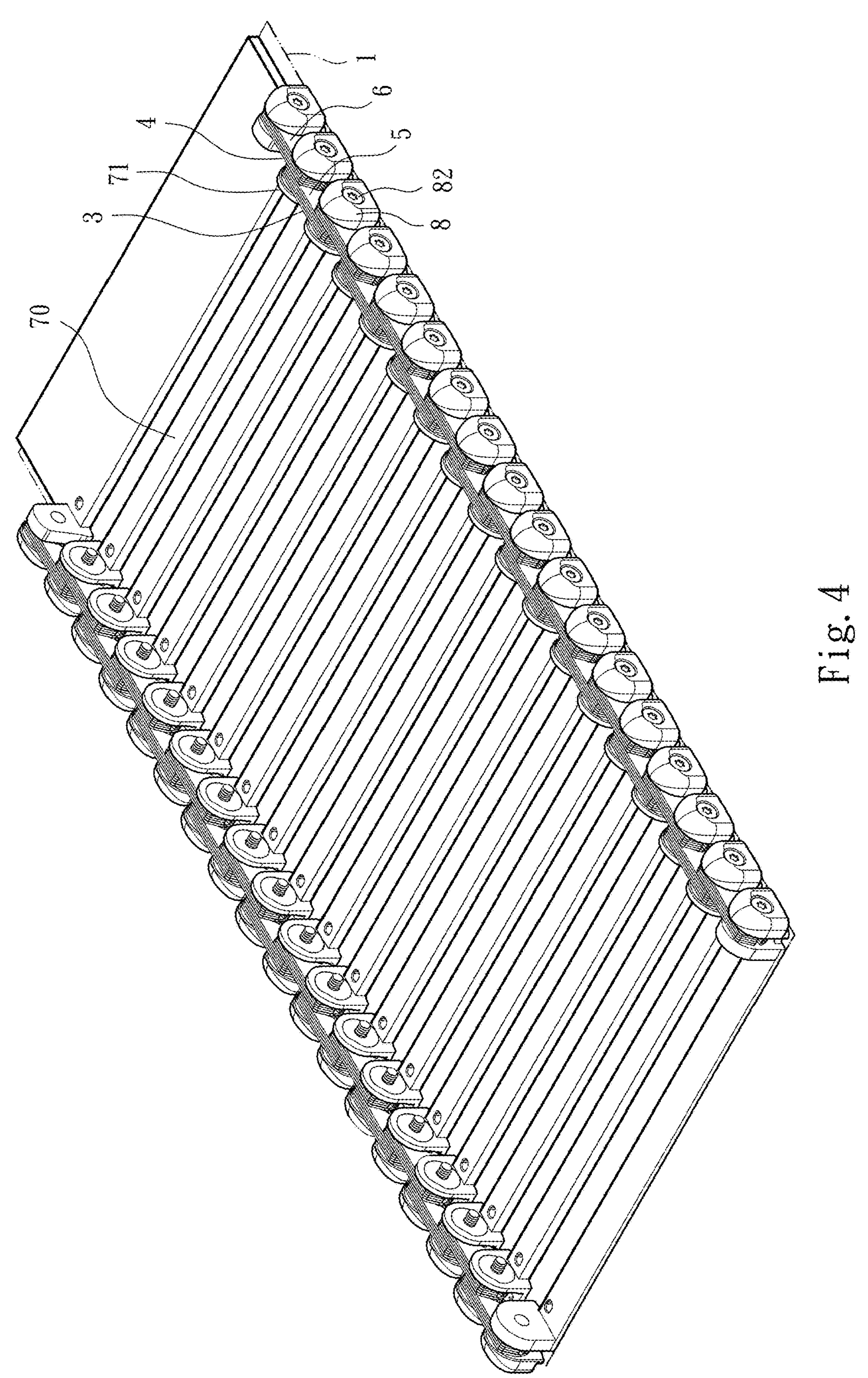
FIG. 4 is a fully assembled view of FIG. 1.

Please refer to FIGS. 1 to 4. A pivot shaft torque mechanism according to a preferred embodiment of the present invention mainly includes a flexible plate 1, a plurality of pivot shafts 2, and a torque chain unit 340. The flexible plate 1 is a piece of flexibly bendable plate. The pivot shafts 2 are equally spaced on an outer surface of the flexible plate 1 and are movable synchronously in a linked motion. A line of centers L passing through the centers of all the pivot shafts 2 is extended in parallel with the flexible plate 1, and each of the pivot shafts 2 includes an axially extended flat portion 22.

In an operable embodiment, the flexible plate 1 may be provided on one side surface with a support unit 7, depending on actual need. The support unit 7 includes a plurality of elongated supports 70, which are equally spaced and parallelly arranged on the flexible plate 1. Each of the supports 70 includes at least one supporting section 71 provided with an engaging bore 72 that extends through the supporting section 71. The engaging bores 72 respectively have one pivot shaft 2 extended therethrough, such that the pivot shafts 2 engaged with the parallelly located engaging bores 72 can have a line of centers L extended in parallel with the flexible plate 1.

The torque unit 340 consists of a first torque plate set 3 and a second torque plate set 4. The first torque plate set 3 includes a plurality of first torque plates 31 respectively having a first shaft hole 31 and a first elongated shaft hole 32 for fitting on around two adjacent pivot shafts 2. The first shaft hole 31 is provided on its periphery with a first outer cut 311 communicable with an outer side of the first shaft hole 31, and a first straight portion 312. The first elongated shaft hole 32 is provided at a middle portion with a first inward protruded curved section 321, based on which an internal space of the first elongated shaft hole 32 is divided into a first front space 322 located closer to the first shaft hole 31 and a first rear space 323 located farther away from the first shaft hole 31.

In an operable embodiment, an end of the first shaft hole 31 located opposite to the first outer cut 311 is communicable with a first hollow hole 314 via a first inner cut 313. This design provides the first shaft hole 31 with an elasticity for expansion and deformation and a space for receiving an amount of required lubricant. An end of the first elongated shaft hole 32 located closer to the first shaft hole 31 is provided with a first front curved edge 3221 and an end of the first elongated shaft hole 32 locate opposite to the first shaft hole 31 is provided with a rear curved edge 3231. The first front curved edge 3221 includes a first front retreated portion 3222 and the first rear curved edge 3231 includes a first rear retreated portion 3232. The first front retreated portion 3222 and the first rear retreated portion 3232 provide the first elongated shaft hole 32 with an elasticity for expansion and deformation and a space for receiving required lubricant. The first inward protruded curved section 321 includes a first front stop section 3211 facing toward the first front space 322 and a first rear stop section 3212 facing toward the first rear space 323.

The second torque plate set 4 includes a plurality of second torque plates 40 respectively having a second shaft hole 41 and a second elongated shaft hole 42 configured corresponding to the first shaft hole 31 and the first elongated shaft hole 32, respectively, for fitting on around two adjacent pivot shafts 2, such that each of the second torque plates 40 is connected to and overlaps one of the first toque plate 30 via one common pivot shaft 2 that extends through the second elongated shaft hole 42 of the second torque plate 40 and the first shaft hole 31 of the adjacent first torque plate 30, or extends through the second shaft hole 41 on the second torque plate 40 and the first elongated shaft hole 32 of the adjacent first torque plate 30. The second shaft hole 41 is provided on its periphery with a second outer cut 411 communicable with an outer side of the second shaft hole 41, and a second straight portion 412. The second elongated shaft hole 42 is provided at a middle portion with a second inward protruded curved section 421, based on which an internal space of the second elongated shaft hole 42 is divided into a second front space 422 located closer to the second shaft hole 41 and a second rear space 423 located farther away from the second shaft hole 41.

In an operable embodiment, an end of the second shaft hole 41 located opposite to the second outer cut 411 is communicable with a second hollow hole 414 via a second inner cut 413. This design provides the second shaft hole 41 with an elasticity for expansion and deformation and a space for receiving an amount of required lubricant. An end of the second elongated shaft hole 42 located closer to the second shaft hole 41 is provided with a second front curved edge 4221 and an end of the second elongated shaft hole 42 locate opposite to the second shaft hole 41 is provided with a rear curved edge 4231. The second front curved edge 4221 includes a second front retreated portion 4222 and the second rear curved edge 4231 includes a second rear retreated portion 4232. The second front retreated portion 4222 and the second rear retreated portion 4232 provide the second elongated shaft hole 42 with an elasticity for expansion and deformation and a space for receiving required lubricant. The second inward protruded curved section 421 includes a second front stop section 4211 facing toward the second front space 422 and a second rear stop section 4212 facing toward the second rear space 423.

When the pivot shafts 2 are located in the first and the second front spaces 322, 422, there is a gap left between a partial surface of each pivot shaft 2 and each of the first and the second front curved edges 3221, 4221; the gaps and the first and the second front retreated portions 3222, 4222 enable the first and the second front spaces 322, 422 to temporarily elastically expand, so that the pivot shafts 2 can fully pass through the first and the second inward protruded curved section 321, 421 into the first and the second front spaces 322, 422. Similarly, when the pivot shafts 2 are located in the first and the second rear spaces 323, 423, there is a gap left between a partial surface of each pivot shaft 2 and each of the first and the second rear curved edges 3231, 4231; the gaps and the first and the second rear retreated portions 3232, 4232 enable the first and the second rear spaces 323, 423 to temporarily elastically expand, so that the pivot shafts 2 can fully pass through the first and the second inward protruded curved section 321, 421 into the first and the second rear spaces 323, 423.

In an operable embodiment, depending on actual need, the first and the second torque plate set 3, 4 may further have a first stop plate set 5 and a second stop plate set 6, respectively, superposed thereon. The first stop plate set 5 includes a plurality of first stop plates 50, and the second stop plate set 6 includes a plurality of second stop plates 60. The first stop plates 50 are superposed on the first torque plates 30 and are respectively provided with a first limiting hole 51 corresponding to the first shaft hole 31 and a first elongated limiting hole 52 corresponding to the first elongated shaft hole 32 for fitting on around two adjacent pivot shafts 2. The second stop plates 60 are superposed on the second torque plates 40 and are respectively provided with a second limiting hole 61 corresponding to the second shaft hole 41 and a second elongated limiting hole 62 corresponding to the second elongated shaft hole 42 for fitting on around two adjacent pivot shafts 2, so as to prevent the pivot shafts 2 from loosening from the first and the second torque plates 30, 40.

In the preferred embodiment, a distal end of each of the pivot shafts 2 located farther away from the support 71 is provided with a fastening hole 21. A pressing cover 8 is fitted on the pivot shaft 2 and located around the fastening hole 21. The pressing cover 8 is provided with a through hole 81 for a fastening element 82 to extend therethrough into the fastening hole 21, so that the pressing cover 8 is fixedly fastened to the distal end of the pivot shaft 2.

Figures 5, 6:
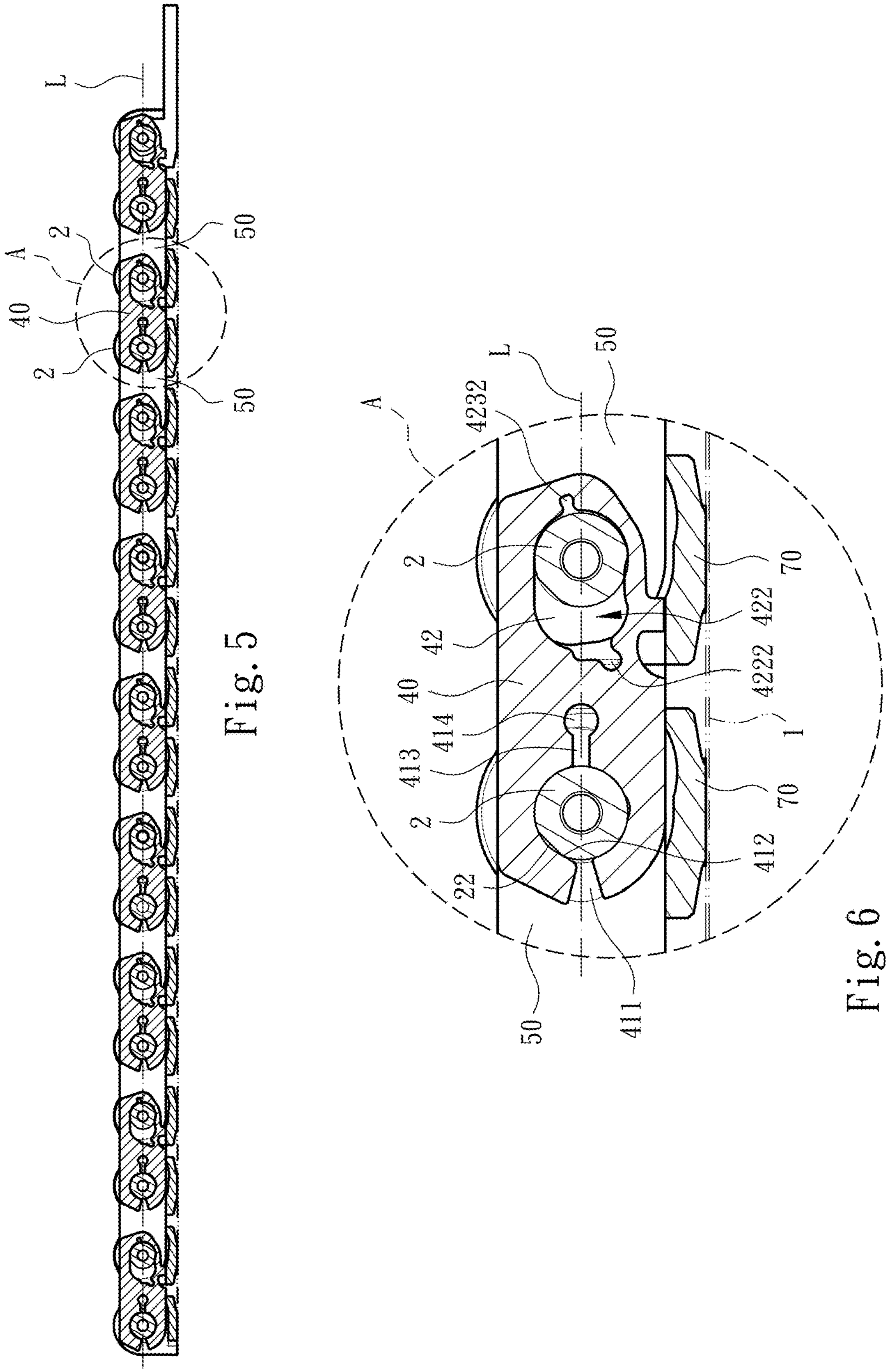
FIG. 5 is a side view of FIG. 4 showing the present invention in practical application, wherein the first and the second torque plates are in a fully extended and flat state.
FIG. 6 is an enlarged view of the circled area A of FIG. 5.

Please refer to FIGS. 5 to 8. In practical application of the present invention, the flexible plates 1 can be fully extended into a flat state, as shown in FIG. 5. In this case, a part of the pivot shafts 2 are located in the first rear spaces 323 of the first elongated shaft holes 32 to be held between the first rear stop sections 3212 and the first rear curved edges 3231. Meanwhile, the flat portions 22 of these pivot shafts 2 are rotated to a position partially having a small-angle interference with the second straight portions 412 of the second shaft holes 41. On the other hand, the adjacent pivot shafts 2 are located in the second rear spaces 423 of the second elongated shaft holes 42 and held between the second rear stop sections 4212 and the second rear curved edges 4231. Meanwhile, the flat portions 22 of the adjacent pivot shafts 2 are rotated to a position partially having a small-angle interference with the first straight portions 312 of the first shaft holes 31, as shown in FIG. 6. When the pivot shafts 2 are fixedly held in the first and the second rear spaces 323, 423, the first and the second torque plates 30, 40 are self-locked to the fully extended flat state, and the first and the second straight portions 312, 412 have the function of guiding the flat portions 22 of the pivot shafts 2 to rotate to the position of being fully flatly attached to the first and second shaft holes 31, 41, which in turn enables the pivot shafts 2 to move the flexible plate 1 via the supports 70 of the support unit 7 as a linked motion, so that the flexible plate 1 generates a force to keep the flat state and has sufficient structural strength to withstand an operational force applied thereto.

Figure 8:
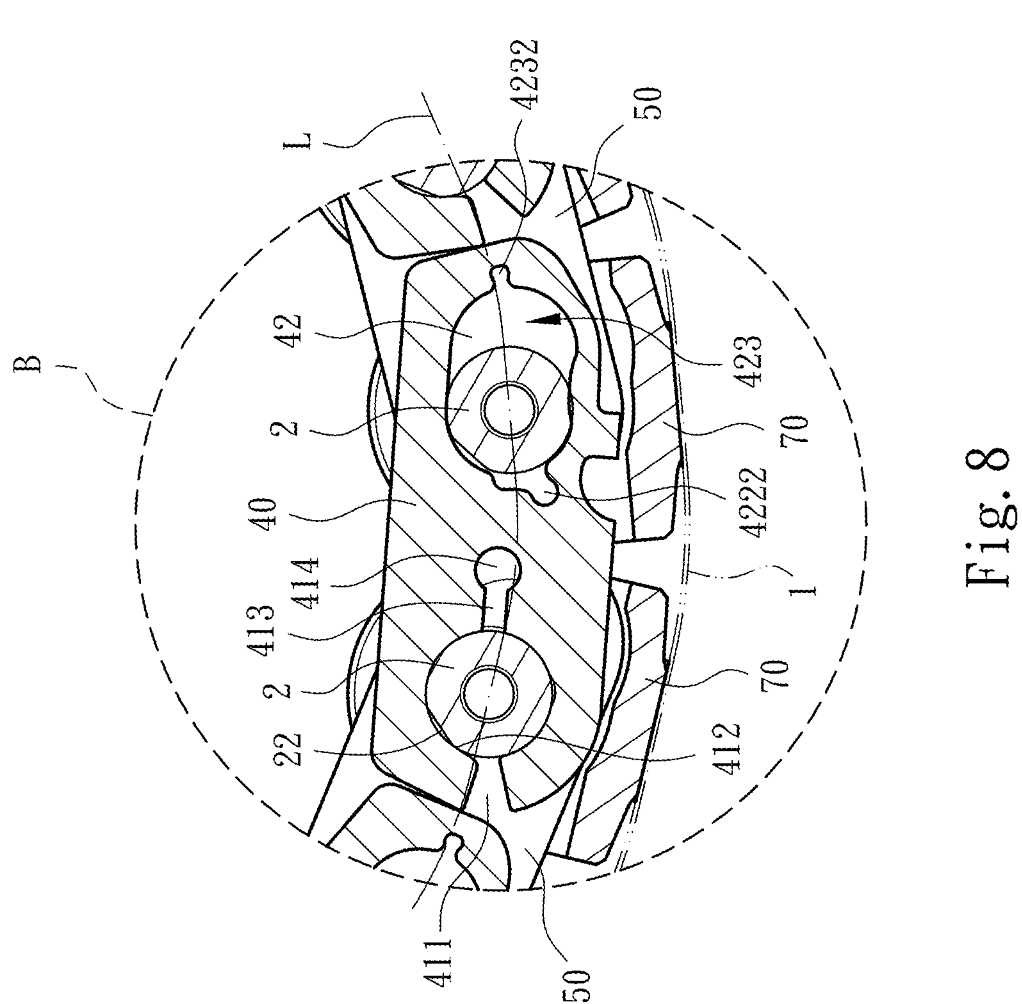
FIG. 8 is an enlarged view of the circled area B of FIG. 7.
Figure 7:
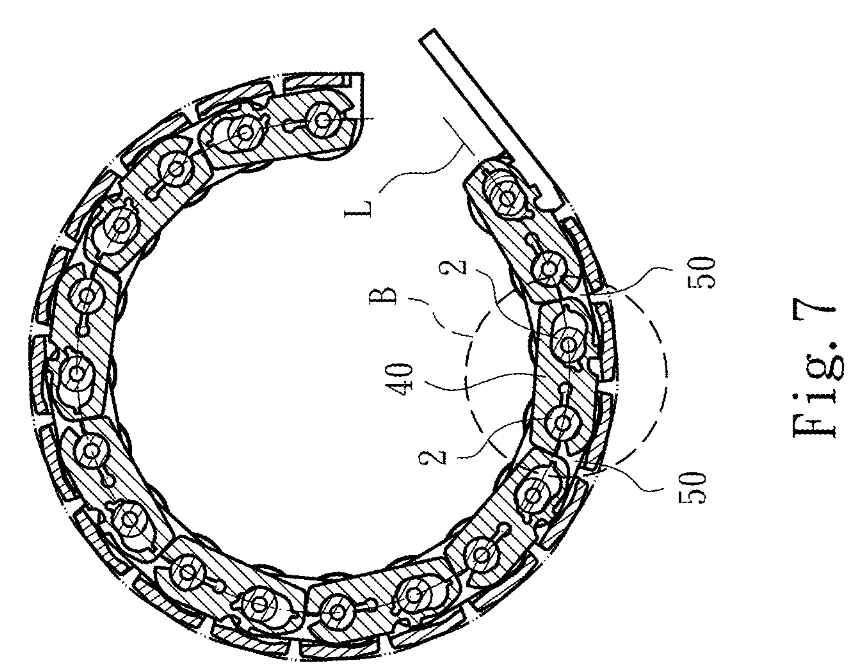
FIG. 7 is another side view showing the present invention in practical application, wherein the first and the second torque plates are in a fully bent and roller state.

When the flexible plate 1 is in a fully bent and rolled state, as shown in FIG. 7, a part of the pivot shafts 2 are located in the first front spaces 322 of the first elongated shaft holes 32 and held between the first front stop sections 3211 and the first front curved edges 3221. Meanwhile, the flat portions 22 of these pivot shafts 2 are rotated to a position partially having a large-angle interference with the second straight portions 412 of the second shaft holes 41. On the other hand, the adjacent pivot shafts 2 are located in the second front spaces 422 of the second elongated shaft holes 42 and held between the second front stop sections 4211 and the second front curved edges 4221. Meanwhile, the flat portions 22 of the adjacent pivot shafts 2 are rotated to a position partially having a large-angle interference with the first straight portions 312 of the first shaft holes 31, as shown in FIG. 8. Since the large-angle interference between the first and the second straight portions 312, 412 and the flat portions 22 generates only a relatively small guiding force and the adjacent pivot shafts 2 are held in the first and the second front spaces 322, 422, the first and the second torque plates 30, 40 are self-locked to the bent and roller state. At this point, the flexible plate 1 is held immovable by the pivot shafts 2 via the supports 70 of the support unit 7 as a linked motion, so that the flexible plate 1 maintains the bent and rolled state.

The above described pivot shaft torque mechanism of the present invention in practical application has the following features:

(1) When the flexible plate 1 is in a fully extended and flat state, the first and the second straight portions 312, 412 can guide the flat portions 22 on the pivot shafts 2 to rotate to a position being completely flatly attached to the first and the second shaft holes 31, 41, and the pivot shafts 2 are held in the first and the second rear spaces 323, 423. At this point, the pivot shafts 2 enable the flexible plate 1 to generate a force to keep it in the extended and flat state and have a structural strength sufficient to withstand an operational force applied thereto.

(2) The first and the second elongated shaft holes 32, 42 are respectively provided at a middle portion with the first and the second inward protruded curved section 321, 421, which can stop and hold the pivot shafts 2 in the first and the second front spaces 322, 422 or the first and the second rear spaces 323, 423, so that the flexible plate 1 can be self-locked no matter it is in the bent and roller state or the extended and flat state.

(3) The pivot shafts 2 are spaced on the flexible plate 1. When the pivot shafts 2 move along with the first and the second torque plate set 3, 4, there would not be any bent or sharply protruded area appeared on the pivot shafts 2. Further, with the flexibility of the flexible plate 1, a smooth curved surface can always be maintained between each of the pivot shafts 2 and the flexible plate 1 to effectively avoid the flexible plate 1 and any device provided thereon from abrasion and damage.

(4) In the process the flexible plate 1 is extended or bent, the pivot shafts 2 are directly brought to pivot synchronously, such that the first and the second torque plates 30, 40 also move synchronously with the pivot shafts 2. Further, the supports 70, to which the pivot shafts 2 are fixed, do not have any mechanism to cause direct contact of them with each other. Therefore, the flexible plate 1 would not be stuck by anything when it is being extended or bent, enabling the flexible plate 1 to be smoothly extended or bent.

According to the above discussion, the pivot shaft torque mechanism of the present invention can be advantageously preloaded and has the self-locking function, so that it is able to effectively prevent the flexible plate from gravitating down and let the flexible plate maintain stable and reliable no matter it is in an extended or a bent state. Therefore, the present invention meets the requirements of novelty and improvement for granting a patent. It is also understood the present invention has been described with some preferred embodiments thereof and it is understood that many changes and modifications in the described embodiments can be carried out without departing from the scope and the spirit of the invention that is intended to be limited only by the appended claims.

What is claimed is:

1. A pivot shaft torque mechanism, comprising:

a flexibly bendable flexible plate (1);

a plurality of pivot shafts (2) being equally spaced on a surface of the flexible plate (1) and movable synchronously in a linked motion; and having a line of centers (L) joining centers of the pivot shafts (2) extended in parallel with the flexible plate (1); and a torque chain unit (340) consisting of a first torque plate set (3) and a second torque plate set (4); the first torque plate set (3) including a plurality of first torque plates (30) located at a first linking position, and each of the first torque plates (30) being provided with a first shaft hole (31) and a first elongated shaft hole (32); the second torque plate set (4) including a plurality of second torque plates (40) located at a second linking position, which is in parallel with the first linking position, and each of the second torque plates (40) being provided with a second shaft hole (41) and a second elongated shaft hole (42); the second shaft holes (41) being located corresponding to the first elongated shaft holes (32), and the second elongated shaft holes (42) being located corresponding to the first shaft holes (31); each of the pivot shafts (2) being extended through and pivotally connected to each pair of correspondingly located first shaft hole (31) and second elongated shaft hole (42) or each pair of correspondingly located first elongated shaft hole (32) and second shaft hole (41), such that the second torque plates (40) and the first torque plates (30) overlap each other and are arranged alternately to be connected serially via the pivot shafts (2); and the flexible plate (1) being changeable between a flat state and a bent state in response to an external force applied thereto, while the first and the second elongated shaft holes (32, 42) providing the pivot shafts (2) with a space for displacement to adapt to a change of interval between the first and the second torque plates (30, 40) and between the pivot shafts (2) when the flexible plate (1) is extended or bent.

2. The pivot shaft torque mechanism as claimed in claim 1, wherein each of the first shaft holes (31) is provided at a lateral side with a first straight portion (312) and a first outer cut (311) that is communicable with an outer side of the first shaft hole (31), each of the second shaft holes (41) is provided at a lateral side with a second straight portion (412) and a second outer cut (411) that is communicable with an outer side of the second shaft hole (41), and each of the pivot shafts (2) is provided on an outer surface with a flat portion (22); and wherein when the flexible plate (1) is fully extended into the flat state, the flat portions (22) are rotated to a position being partially angularly interfered with the first and the straight portions (312, 412), such that the first torque plate set (3) and the second torque plate set (4) respectively generate a force to push the pivot shafts (2) toward a location capable of keeping the flexible plate (1) in the flat state.

3. The pivot shaft torque mechanism as claimed in claim 1, wherein each of the first and the second elongated shaft holes (32, 42) includes a first and a second inward protruded curved section (321, 421), respectively, which is located at a middle portion of a displacement path of the pivot shaft (2) in the first and the second elongated shaft hole (32, 42); the first elongated shaft hole (32) being divided into a first front space (322) and a first rear space (323) based on the first inward protruded curved section (321); and the second elongated shaft hole (42) being divided into a second front space (422) and a second rear space (423) based on the second inward protruded curved section (421).

4. The pivot shaft torque mechanism as claimed in claim 3, wherein the first inward protruded curved section (321) includes a first front stop section (3211) facing toward the first front space (322) and a first rear stop section (3212) facing toward the first rear space (323), and the second inward protruded curved section (421) includes a second front stop section (4211) facing toward the second front space (422) and a second rear stop section (4212) facing toward the second rear space (423); and wherein when the flexible plate (1) is in the bent state, the pivot shafts (2) are located in the first and the second front spaces (322, 422) of the first and the second elongated shaft holes (32, 42) and pressed against the first and the second front stop sections (3211, 4211), respectively, to provide a locating effect of forcing the flexible plate (1) to keep the bent state; and wherein when the flexible plate (1) is in the extended flat state, the pivot shafts (2) are located in the first and the second rear spaces (323, 423) of the first and the second elongated shaft holes (32, 42) and pressed against the first and the second rear stop sections (3212, 4212), respectively, to provide a locating effect of forcing the flexible plate (1) to keep the flat state.

5. The pivot shaft torque mechanism as claimed in claim 1, wherein an end of each of the first and the second shaft holes (31, 41) located farther away from the first and the second outer cut (311, 411) communicates with a first and a second hollow hole (314, 414) via a first and a second inner cut (312, 413), respectively.

6. The pivot shaft torque mechanism as claimed in claim 2, wherein an end of each of the first and the second shaft holes (31, 41) located farther away from the first and the second outer cut (311, 411) communicates with a first and a second hollow hole (314, 414) via a first and a second inner cut (312, 413), respectively.

7. The pivot shaft torque mechanism as claimed in claim 1, wherein each of the first and the second elongated shaft holes (32, 42) are provided at an end close to the first and the second shaft hole (31, 41) with a first and a second front retreated portion (3222, 4222), respectively, and at another end farther away from the first and the second shaft hole (31, 41) with a first and a second rear retreated portion (3232, 4232), respectively.

8. The pivot shaft torque mechanism as claimed in claim 3, wherein each of the first and the second elongated shaft holes (32, 42) are provided at an end close to the first and the second shaft hole (31, 41) with a first and a second front retreated portion (3222, 4222), respectively, and at another end farther away from the first and the second shaft hole (31, 41) with a first and a second rear retreated portion (3232, 4232), respectively.

9. The pivot shaft torque mechanism as claimed in claim 1, further comprising a first and a second stop plate set (5, 6) superposed on the first and the second torque plate set (3, 4), respectively; the first and the second stop plate set (5, 6) including a plurality of first and second stop plates (50, 60), respectively; the first stop plates (50) being superposed on the first torque plates (30) and respectively including a first limiting hole (51) and a first elongated limiting hole (52) corresponding to the first shaft hole (31) and the first elongated shaft hole (32) on the first torque plate (30), respectively; and the second stop plates (60) being superposed on the second torque plates (40) and respectively including a second limiting hole (61) and a second elongated limiting hole (62) corresponding to the second shaft hole (41) and the second elongated shaft hole (42) on the second torque plate (40), respectively.

10. The pivot shaft torque mechanism as claimed in claim 2, further comprising a first and a second stop plate set (5, 6) superposed on the first and the second torque plate set (3, 4), respectively; the first and the second stop plate set (5, 6) including a plurality of first and second stop plates (50, 60), respectively; the first stop plates (50) being superposed on the first torque plates (30) and respectively including a first limiting hole (51) and a first elongated limiting hole (52) corresponding to the first shaft hole (31) and the first elongated shaft hole (32) on the first torque plate (30), respectively; and the second stop plates (60) being superposed on the second torque plates (40) and respectively including a second limiting hole (61) and a second elongated limiting hole (62) corresponding to the second shaft hole (41) and the second elongated shaft hole (42) on the second torque plate (40), respectively.

11. The pivot shaft torque mechanism as claimed in claim 3, further comprising a first and a second stop plate set (5, 6) superposed on the first and the second torque plate set (3, 4), respectively; the first and the second stop plate set (5, 6) including a plurality of first and second stop plates (50, 60), respectively; the first stop plates (50) being superposed on the first torque plates (30) and respectively including a first limiting hole (51) and a first elongated limiting hole (52) corresponding to the first shaft hole (31) and the first elongated shaft hole (32) on the first torque plate (30), respectively; and the second stop plates (60) being superposed on the second torque plates (40) and respectively including a second limiting hole (61) and a second elongated limiting hole (62) corresponding to the second shaft hole (41) and the second elongated shaft hole (42) on the second torque plate (40), respectively.

12. The pivot shaft torque mechanism as claimed in claim 1, further comprising a support unit (7) provided on the surface of the flexible plate (1); the support unit (7) including a plurality of elongated supports (70) parallelly arranged side by side, and the pivot shafts (2) being fastened to the supports (70).

13. The pivot shaft torque mechanism as claimed in claim 2, further comprising a support unit (7) provided on the surface of the flexible plate (1); the support unit (7) including a plurality of elongated supports (70) parallelly arranged side by side, and the pivot shafts (2) being fastened to the supports (70).

14. The pivot shaft torque mechanism as claimed in claim 3, further comprising a support unit (7) provided on the surface of the flexible plate (1); the support unit (7) including a plurality of elongated supports (70) parallelly arranged side by side, and the pivot shafts (2) being fastened to the supports (70).

15. The pivot shaft torque mechanism as claimed in claim 9, further comprising a support unit (7) provided on the surface of the flexible plate (1); the support unit (7) including a plurality of elongated supports (70) parallelly arranged side by side, and the pivot shafts (2) being fastened to the supports (70).

16. The pivot shaft torque mechanism as claimed in claim 12, wherein each of the supports (70) is provided with at least one supporting section (71), and each of the supporting sections (71) being provided with an engaging bore (72) for one of the pivot shafts (2) to engage therewith.

17. The pivot shaft torque mechanism as claimed in claim 13, wherein each of the supports (70) is provided with at least one supporting section (71), and each of the supporting sections (71) being provided with an engaging bore (72) for one of the pivot shafts (2) to engage therewith.

18. The pivot shaft torque mechanism as claimed in claim 14, wherein each of the supports (70) is provided with at least one supporting section (71), and each of the supporting sections (71) being provided with an engaging bore (72) for one of the pivot shafts (2) to engage therewith.

19. The pivot shaft torque mechanism as claimed in claim 15, wherein each of the supports (70) is provided with at least one supporting section (71), and each of the supporting sections (71) being provided with an engaging bore (72) for one of the pivot shafts (2) to engage therewith.

20. The pivot shaft torque mechanism as claimed in claim 16, wherein each of the pivot shafts (2) has a distal end that is located farther away from the supporting section (71) and extended through and pivotally connected to the torque chain unit (340), and the distal ends of the pivot shafts (2) being respectively covered with a pressing cover (8).

21. The pivot shaft torque mechanism as claimed in claim 20, wherein the distal end of each of the pivot shafts (2) is provided with a fastening hole (21) and each of the pressing covers (8) is provided with a through hole (81); and a plurality of fastening elements (82) being extended through the through holes (81) to be removably fastened to the fastening holes (21) for covering the pressing covers (8) on the distal ends of the pivot shafts (2).

* * * * *